United States Patent [19]
Dynes et al.

[11] 4,370,640
[45] Jan. 25, 1983

[54] METAL-SEMICONDUCTOR THERMAL SENSOR

[75] Inventors: Robert C. Dynes, Summit, N.J.; John M. Mochel, Champaign, Ill.

[73] Assignee: Bell Telephone Laboratories, Incorporated, Murray Hill, N.J.

[21] Appl. No.: 186,004

[22] Filed: Sep. 10, 1980

[51] Int. Cl.³ ............................................. H01C 7/04
[52] U.S. Cl. ..................................... 338/25; 338/308
[58] Field of Search .................... 338/25, 18, 307–309; 357/28; 75/134 S, 134 G; 204/192 C, 192 F; 427/87, 124–126

[56] References Cited

U.S. PATENT DOCUMENTS

| | | | |
|---|---|---|---|
| 3,898,605 | 8/1975 | Burns | 338/18 |
| 3,942,010 | 3/1976 | Peterson et al. | 250/352 |
| 4,063,210 | 12/1977 | Collver | 338/308 X |
| 4,063,211 | 12/1977 | Yasujima et al. | 204/192 F X |

OTHER PUBLICATIONS

R. P. Anantatmula, et al., "Comments On Microstructure of Dissociated Gold–Silicon Alloy by Sputter Etching and Scanning Electron Microscopy," *Materials Science and Eng.*, vol. 20, pp. 97–98, 1975.

J. J. Hauser, et al., "Electrical Properties of Binary Amorphous Alloys" *Physical Review B*, vol. 17, pp. 3371–3380, 1978.

B. Stryker, et al. "Super Conductivity of Amorphous Germanium Alloy Films," *12th International Conference on Low Temperature Physics*, Kyoto, Japan, pp. 339–340, 1970.

N. Kisimoto, et al., "Metal-Nonmetal Trousiton In Amorphous Si-Au System at Low Temp's: Measurements of Electricl Cond., and Thermoelectric Power", *Journal of the Physical Society of Japan*, vol. 46, pp. 846–854, 1979.

*Primary Examiner*—C. L. Albritton
*Attorney, Agent, or Firm*—Peter V. D. Wilde; James H. Fox

[57] ABSTRACT

A metal-semiconductor variable resistance temperature or infrared energy measuring device is described, along with a method for making it. The device may be made as a thin film, and typically operates over the range of at least 1 degree K to 300 degrees K. The device typically has an approximately 1/T temperature dependence of resistance. In one embodiment, gold is used as the metal, and germanium the semiconductor. The metal subsists as metallic or intermetallic globules dispersed in a semiconductor matrix, and may be formed by heating a metastable metal-semiconductor alloy until the metal precipitates out as described.

26 Claims, 4 Drawing Figures

METAL-SEMICONDUCTOR THERMAL SENSOR

BACKGROUND OF THE INVENTION

1. Field of the Invention

This invention is directed to a temperature or thermal radiation sensor in the form of a metal-semiconductor film.

2. Description of the Prior Art

To measure cryogenic temperatures, the prior art teaches the use of such devices as bulk single crystal doped germanium thermometers. These generally have an exponential temperature dependence of resistance of the form $e^{-Eg/T}$. Germanium devices can be useful down to about 1 degree K., and are in fact the only practical prior art means known to the present inventors for measuring temperatures below about 50 degrees K.

At somewhat higher cryogenic temperatures, say above 100 degrees K., variable resistance metal thermometers may be used. Also, thermocouple devices that consist of dissimilar metals may be used at the higher cryogenic temperatures. However, the prior art techniques generally do not allow for ready measurement over a wide cryogenic temperature range up to room temperature, that is, from about 1 degree K. to 300 degrees K. This is due to reduced sensitivities of the prior art devices in certain regions of this range. In addition, particularly with the metal resistance devices, such a large amount of power must be dissipated by the devices that the experimental conditions may be affected by the heat produced.

In addition, the prior art devices often have a significant hysteresis effect, making the measurements not readily reproducible. Finally, the relatively large mass of many prior art devices limits their ability to rapidly respond to temperature changes.

Clearly, it would be very desirable to have a device that could accurately and reproducibly measure temperatures over a wide range with high sensitivity and with fast response capability.

SUMMARY OF THE INVENTION

We have invented a variable resistance temperature or thermal radiation measuring device that comprises metallic or intermetallic regions dispersed in a semiconductor matrix to form a two-phase body. A preferred method of making the device is by first depositing a metal and semiconductor on a substrate by evaporation, sputtering, or other techniques, to form a metastable homogeneous alloy. The film is then heated until the metal precipitates out to form metallic or intermetallic regions dispersed in the semiconductor matrix.

DETAILED DESCRIPTION

Figure 1:
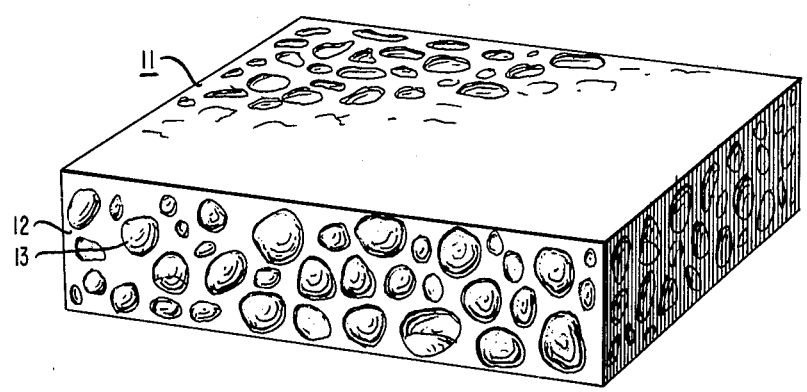
FIG. 1 shows metallic or intermetallic globules dispersed in a semiconductor matrix to form a thermal sensitive material.

This detailed description covers a temperature and thermal radiation sensitive device and a method for making it. By "thermal radiation" is meant any radiation capable of changing the temperature of the device, including infrared electromagnetic radiation. The device comprises a two-phase metal-semiconductor film in the form of metallic or intermetallic regions, or both, suspended in a semiconductor matrix. The regions may assume various shapes, with globular regions being typical, with a typical representation as shown in FIG. 1. However, during fabrication, the metal may in some cases temporarily exist in a non-equilibrium (metastable) homogeneous phase with the semiconductor. In all cases included herein, the concentration of the metal suspended in the semiconductor is greater than the equilibrium solubility limit of the metal in the semiconductor, but less than the percolation limit. The metallic and intermetallic regions that are dispersed in the semiconductor matrix are also referred to herein as "globules", with it being understood that other shapes are possible.

The semiconductor matrix is typically multicrystalline, comprising microcrystallites of at least 10 Angstroms (1.0 nanometers) diameter, but single crystal and amorphous states are believed possible. The metallic portion typically comprises gold, copper, or silver, with other metals possible. As used herein, the term "metal" and its derivatives refer to those elements and alloys having electrical resistivities of less than 300 microhm-cm. The term "semiconductor" refers to those elements, compounds, and alloys having an intrinsic resistivity of 0.1 ohm-cm or more, and having an energy gap between the valence band and the conduction band of less than 2 volts, at 20 degrees C. Typical semiconductors are germanium and silicon, with other semiconductors being possible. The term "intermetallic" means any compound comprising at least one metal and having a resistivity of less than 300 microhm-cm. The intermetallics include metal compounds and metal-semiconductor compounds. For example, $Cu_3Ge$ is an intermetallic in the copper-germanium system, consisting of a metal and a semiconductor, while $Cu_3Au$ is an intermetallic consisting of two metals.

It is theorized that the temperature dependent phenomena exhibited by the inventive device are associated with electron hopping and/or electron tunneling between the metallic and/or intermetallic dispersed regions in the semiconductor matrix. The theory further indicates that a wide variety of metal-semiconductor combinations having the required dispersed region-matrix configuration will exhibit the noted effects. Thus, while the specific metal-semiconductor combinations described herein have been found to be suitable embodiments of the present invention and can be fabricated in the required form by otherwise known techniques, they in no way limit the metals and semiconductors, as defined above, which may be used in practicing the present invention.

The presently preferred procedure for making the device is by first depositing the metal and the semiconductor as a metastable homogeneous alloy on a substrate. As used herein, the term "homogeneous alloy" means that substantially no inhomogeneous regions as large as 10 Angstroms (1.0 nanometers) diameter exist in the alloy, as may be determined by electron microscopy or other techniques. Evaporation and sputtering are typical deposition techniques, with others being possible. The thicknesses of the films made thus far are 250 Angstroms to 10,000 Angstroms (0.025-1.0 micrometers), but there is no known upper thickness limit. The lower thickness is believed limited only by the requirement that the film be thicker than the diameters of the globules that form upon baking.

After deposition, the film is baked at a temperature sufficient to cause the metal to at least partially precipitate out of the metastable phase and form a two-phase system comprising metallic or intermetallic globules (or both) in a semiconductor matrix. During baking, the film changes from a low resistivity material having a resistivity that increases with temperature, or is approximately independent of temperature, to a higher resistivity material having a resistivity that decreases with increasing temperature. This transition occurs when the film, measured at 20 degrees C., obtains a resistivity of approximately 300 microhm-centimeters. Resistivities substantially greater than this amount, and typically greater than 1000 microhm-centimeters, are characteristic of the inventive films included herein, whether obtained by the presently preferred baking technique or otherwise.

Figure 3:
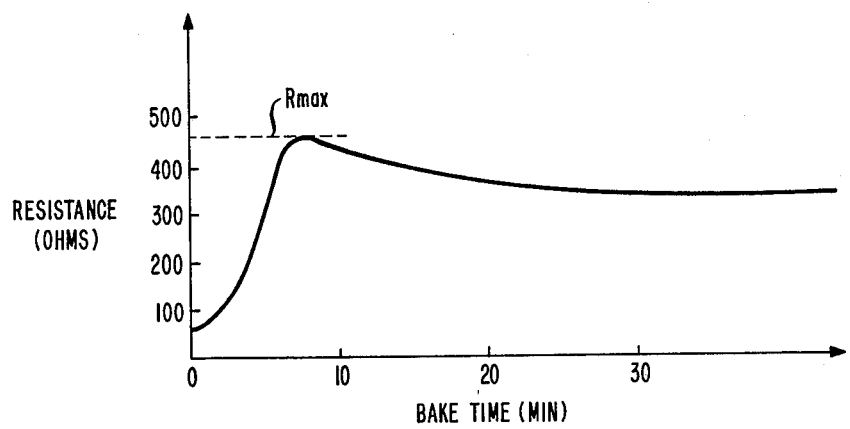
FIG. 3 shows a typical resistance versus bake time curve.

The baking conditions are typically such that the globules formed are at least 10 Angstroms (1.0 nanometers) in diameter. The globule size can be estimated from resistance measurements of the film as a function of time at a given baking temperature. The resistance typically initially increases and then decreases to a steady state value. A typical resistance plot versus baking time for the film of Example I (below) is shown in FIG. 3. At maximum resistance, the diameter of the gold globules is approximately 5 to 10 Angstroms (0.5-1.0 nanometers). The resistivity becomes substantially constant after a one-half hour baking time. X-ray analysis of the film shows that less than 1 percent of the baked film remains in the metastable single phase, with this measurement being limited by the accuracy of the analysis equipment used. However, useful devices are obtained even with significant percentages of the gold still remaining in the homogeneous phase, with such gold being considered to be part of the semiconductor matrix, as distinguished from gold in the globules.

To ensure that the globules do not contact one another, the concentration of the metal in the semiconductor is less than a given amount, referred to as the percolation limit. This limit is related to the volume fraction of the metallic or intermetallic globules in the film and is reached when the globules comprise approximately 40 to 60 percent of the volume of the film. Contact among a substantial number of the globules will create a metallic conducting path, producing a resistivity of less than 300 microhm-centimeters, and destroying the desired temperature dependent characteristics. As used herein, the term "dispersed" means that no continuous path of metallic or intermetallic globules exists between the spaced electrical conducting leads on the film. The procedures for making the device will be more fully illustrated by means of the following Example:

EXAMPLE I

Figure 2:
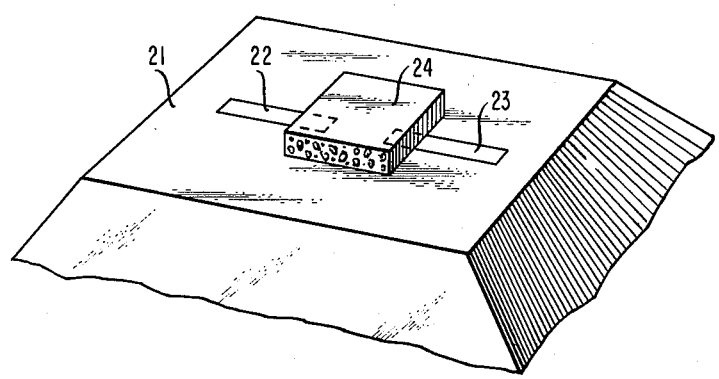
FIG. 2 shows a temperature or thermal radiation sensitive device fabricated as a film.

A film 1 millimeter square was formed by co-evaporating gold and germanium onto a room temperature (20 degrees C.) substrate to a thickness of 1300 Angstroms (0.13 micrometers). The gold concentration in the germanium was 18 atomic percent, and the gold and germanium formed a metastable homogeneous phase as deposited. The film was then heated at 135 degrees C. for 12 hours. The globules that formed were substantially gold. The results of resistance measurements taken across the width of the film at points approximately as shown in FIG. 2 are given in Table I below.

TABLE I

| T(K) | R(ohms) |
|---|---|
| 300. | 401.2 |
| 200. | 602.8 |
| 100. | 1201.6 |
| 77. | 1552.6 |
| 50. | 2418.6 |
| 40. | 3106.5 |
| 30. | 4123.5 |
| 20. | 6205.7 |
| 15. | 8212.1 |
| 10. | 12537.4 |
| 5.0 | 26025.8 |

The results of such measurements imply a resistivity (R) versus temperature (T) dependence of approximately the form $R \propto 1/T$, (actually closer to $1/T^{0.8}$ in this case). This is believed to be unique for a semiconductor device, as the usual temperature dependence for semiconductors is exponential, of the form $$R \propto e^{-Eg/T}$$

where Eg is a constant. Similarly, cermets (metal precipitates in a ceramic background) typically have an exponential temperature dependence. The temperature dependence of the above embodiment is more nearly of the 1/T form for gold concentrations in the range of 16 to 25 percent. At gold concentrations above 25 percent, the resistance changes at a rate that is less than the 1/T rate, especially at low temperatures. Conversely, at gold concentrations less than 16 percent, the resistance changes at a higher rate than the 1/T rate, especially at low temperatures. At some gold concentration between 16 and 25 percent, and typically about 20 percent, the rate is essentially 1/T over the entire temperature range of 1 degree K. to 300 degrees K., with a wider temperature range being possible.

Figure 4:
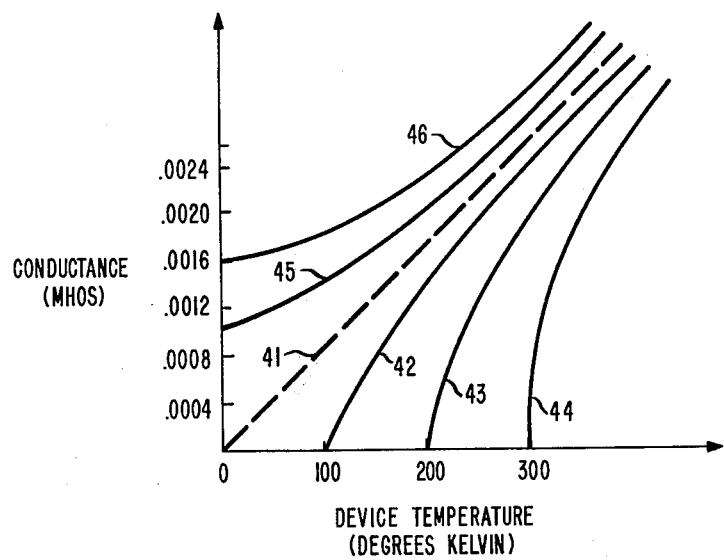
FIG. 4 shows typical conductance versus temperature curves for various device compositions. No inferences as to actual device dimensions or proportion of component materials should be drawn from these Figures.

The above-noted temperature characteristics as a function of composition are further illustrated in FIG. 4 for the Au-Ge system. Curve 41 represents a 1/T temperature dependence, as is approximately obtained for gold concentrations of about 20 atomic percent. As can be seen, the curves vary from a 1/T temperature dependence for gold concentrations substantially outside the 16-25 atomic percent range. For example, curve 42 represents a gold concentration in the range of about 8-15 percent; curve 43, 5-8 percent; and curve 44, 3-5 percent. Curves 45 and 46 represent gold concentrations in the range 25-33 percent. Other metal-semiconductor systems yield curves showing a similar deviation from the 1/T temperature dependence, albeit typically at different metal concentrations.

A first useful parameter characterizing the device is the "intercept temperature", which is the temperature at which the conductivity of the metal-semiconductor region becomes substantially zero. As used herein, a conductivity of less than $10^{-3}$ (ohm-cm)$^{-1}$ is considered to be substantially zero, as actual zero conductivity is not achieved in practice. A second useful parameter is the "intercept conductivity", which is the conductivity near zero degrees kelvin, with precisely zero degrees of course not being obtainable in practice. For wide range and a temperature dependence of resistance approximately of the form 1/T, the intercept temperature is typically less than 50 degrees K., and the intercept conductivity is typically less than 50 (ohm-cm)$^{-1}$ at 4.2 degrees kelvin. However, in many applications, a 1/T temperature dependence is not necessary, and the reproducibility of measurements and rapid response are more significant. In addition, a high intercept temperature may be desirable in certain applications, as the sensitivity of the device, defined as the percentage change in resistance for an incremental percentage change in temperature, (i.e., T/R dR/dT) is greatest in absolute value near the intercept temperature. For example, an intercept temperature of approximately 300 degrees K. is useful for a room-temperature infrared detector.

For a 135 degrees C. (approximately 400 degrees K.) baking temperature, it has been found that the temperature measurements made with the device are highly reproducible up to about 300 degrees K. For example, at 10 degrees K., temperature measurement for the device of Example I is reproducible to within ±15 millidegrees. Higher baking temperatures yield a higher upper limit on the useful temperature range. For the device described above, the sensitivity is essentially constant over the range of 1 degree K. to 300 degrees K.; that is, T/R dR/dT ≈ −1. The equivalent noise power of the device gives a measure of the sensitivity, and for the above-described device, has been found to be $$10^{-14} \frac{\text{watts}}{\sqrt{\text{Hz}}}$$

at a temperature of 1.5 degrees K., which is comparable to bolometers currently in use. Furthermore, because of its fabrication as a thin film, the device described has a fast thermal response time, responding to at least 10 kHz variations in thermal energy. The response time of a typical device is limited by the thermal response time of the substrate, with the film itself typically having a much faster response time. Very little power need be dissipated to obtain useful operation of the device, with the current through the device described typically being approximately 10 microamps. At a temperature of 10 degrees K. and a resistance of a typical device being 12.5K ohms at this temperature, this implies a typical power dissipation of only 12.5 microwatts. This helps reduce the heat load in cryogenic systems, leading to improved accuracy of measurement.

At gold concentrations between 10 and 33 atomic percent, transmission electron microscope (TEM) pictures show that the gold globules are approximately spherical in shape; see FIG. 1 for a representation of typical morphology. Film 11 comprises gold globules 13 suspended in a germanium matrix 12. For the gold concentrations and bake conditions employed thus far, the diameters of the gold globules, after reaching steady-state bake conditions as noted above, have been found to be in the range of about 100 Angstroms to 1000 Angstroms (10–100 nanometers). However, as long as the globules do not substantially contact one another, it is believed that diameters outside this range would also yield satisfactory results. Furthermore, the baking can be stopped before steady-state conditions are reached, and useful device operation results, as long as the resistivity exceeds the above-noted 300 microhm-cm limit at 20 degrees C.

The Au-Ge film is a relatively easy system to produce by the above method, as the gold and germanium have comparable vapor pressures at the evaporation temperature used. The globules that form are substantially gold, with substantially no gold-germanium intermetallics present. However, the other noble metals, copper and silver, can also exist as a metastable single phase in both germanium and silicon, as can gold in silicon. They can also be baked to form a two-phase film, and useful device operation is obtained. Due to the higher melting point of silicon, device operation at temperatures above those attainable with germanium can be achieved. Examples of a copper-germanium and gold-silicon films are given below.

EXAMPLE II

A film 1.17 millimeters long by 1.76 millimeters wide was formed by coevaporating copper and germanium onto a room temperature (20 degrees C.) substrate to a thickness of 2020 Angstroms (0.202 micrometers). The copper concentration in the germanium was 24 atomic percent, and the copper and germanium formed a metastable homogeneous phase as deposited. The film was then heated at 110 degrees C. for 20 hours. The globules that formed were substantially $Cu_3Ge$. The results of resistance measurements taken across the width of the film are given in Table II below.

TABLE II

| T(K) | R(K-ohms) |
|---|---|
| 300 | 4.776 |
| 192.35 | 7.060 |
| 98.5 | 12.62 |
| 77.6 | 15.71 |
| 52.0 | 24.10 |
| 38.0 | 33.90 |
| 32.0 | 42.53 |
| 22.0 | 73.50 |
| 15.0 | 146.0 |
| 4.2 | 5060 |

EXAMPLE III

A film approximately 1 millimeter square was formed by coevaporating gold and silicon onto a room temperature substrate to a thickness of approximately 2500 Angstroms (0.25 micrometers). The film was then heated to 135 degrees C. for 10 hours. It was found that an approximately 1/T temperature dependence of resistance was obtained for gold concentrations of roughly 8–10 atomic percent in the film. The globules that formed were substantially gold.

The presently preferred embodiment of this invention is as a thin film device, typically having a thickness of 10 micrometers or less. An example of a typical device is shown in FIG. 2, wherein spaced electrical conducting leads 22,23 are placed on a substrate 21 and the metal-semiconductor film 24 is deposited on top of the leads. Alternately, the film could be formed first and the leads placed on top, or on alternate sides, etc., with any suitable means of making contact being included herein.

In addition to measuring cryogenic systems, the present device can also be used, for example, as a detector in optical waveguide systems, including optical fiber systems. It can be fabricated on the same substrate as other components, or as a discrete device. An array of these devices can be used as a detector for radiation imaging systems. A multiple device array can be obtained by making a multiplicity of devices shown in FIG. 2. Alternately, a single metal-semiconductor film can be made with a grid of electrical conducting leads formed on the film to obtain the effect of multiple devices.

In addition to the above device and compositions thereof, and the above process for making it, various other additional modifications and extensions of this invention will become apparent to those skilled in the art. For example, various other metal and semiconductor combinations may be useful. The metal may be a compound or alloy, comprising two or more metal species. Likewise, the semiconductor may be a compound or alloy, including GaAs, InP, etc. Other fabrication techniques for producing the two-phase body may be devised, and other device configurations may be found useful. The thermal radiation which can be measured may include various other portions of the electromagnetic spectrum, such as microwave radiation, or particulate radiation, such as alpha and beta rays, or heavier ionic radiation. Due to the multicrystalline semiconductor matrix in one embodiment, the device is expected to be more resistant to damage from such particulate radiation than single crystal devices. All such variations and deviations which basically rely on the teachings through which this invention has advanced the art are properly considered to be within the spirit and scope of this invention.

We claim:

1. A thermal energy sensing device comprising a metal-semiconductor body in contact with spaced electrical conducting leads, characterized in that said body comprises regions selected from the group consisting of metallic and intermetallic dispersed in a semiconductor matrix, wherein the resistivity of said body is greater than 300 microhm-centimeters at 20 degrees C., and the conductivity of said body is less than 50 (ohm-cm)$^{-1}$ at 4.2 degrees kelvin.

2. The device of claim 1 further characterized in that said semiconductor is germanium.

3. The device of claim 2 further characterized in that said regions comprise at least one metal chosen from the group consisting of gold, silver, and copper.

4. The device of claim 3 further characterized in that said body comprises 16 to 25 atomic percent gold.

5. The device of claim 1 further characterized in that said semiconductor is silicon.

6. The device of claim 5 further characterized in that said regions comprise at least one metal chosen from the group consisting of gold, silver, and copper.

7. The device of claim 1 further characterized in that said regions have diameters of less than 100 nanometers.

8. The device of claim 1 further characterized in that the conductivity of said body is substantially non-zero at temperatures above 50 degrees kelvin.

9. The device of claim 1 further characterized in that said matrix of said semiconductor substantially comprises microcrystallites at least 1.0 nanometers in diameter.

10. The device of claim 1 further characterized in that said body has a thickness of not more than 10 micrometers 11. A method of making a variable resistance thermal energy sensing device by steps comprising depositing a metal-semiconductor body on a substrate and providing spaced electrical conducting leads in contact with said body, characterized in that said body is deposited on said substrate as a metastable homogeneous alloy of said metal and said semiconductor, with the concentration of said metal in said semiconductor being greater than the equilibrium solubility limit of said metal in said semiconductor, and further characterized by heating said body until said metal at least partially precipitates out to form regions selected from the group consisting of metallic and intermetallic having diameters of at least 1.0 nanometers dispersed in a matrix of said semiconductor, wherein the resistivity of said body after said heating is greater than 300 microhm-centimeters at 20 degrees C., and the conductivity of said body is less than 50 (ohm-cm)$^{-1}$ at 4.2 degrees kelvin.

12. The method of claim 11 further characterized in that the deposition of said body onto said substrate is accomplished by evaporating said metal and said semiconductor onto said substrate.

13. The method of claim 11 further characterized in that the deposition of said body onto said substrate is accomplished by sputtering said metal and said semiconductor onto said substrate.

14. The method of claim 11 further characterized in that said matrix of said semiconductor substantially comprises microcrystallites at least 1.0 nanometers in diameter after said heating step.

15. The method of claim 11 further characterized in that said semiconductor is germanium.

16. The method of claim 15 further characterized in that said regions comprise at least one metal chosen from the group consisting of gold, silver, and copper.

17. The method of claim 16 further characterized in that said regions are gold comprising 16 to 25 atomic percent of said body.

18. The method of claim 11 further characterized in that said semiconductor is silicon.

19. The method of claim 18 further characterized in that said regions comprise at least one metal chosen from the group consisting of gold, silver, and copper.

20. The method of claim 11 further characterized in that said regions have diameters of less than 100 nanometers.

21. The method of claim 11 further characterized in that the conductivity of said body after said heating is substantially non-zero at temperatures above 50 degrees kelvin.

22. The method of claim 11 further characterized in that the thickness of said body is not more than 10 micrometers.

23. The method of claim 11 further characterized in that said heating continues until a substantially steady-state resistivity of said body is obtained.

24. A thermal energy sensing device produced by the method of claim 11.

25. The device of claim 1 further characterized in that said semiconductor matrix is substantially amorphous.

26. The device of claim 1 further characterized in that said regions have diameters of at least 1.0 nanometers.

* * * * *